United States Patent
Hagan et al.

(10) Patent No.: US 8,370,949 B2
(45) Date of Patent: Feb. 5, 2013

(54) AUTOMATED SCREENING OF CONTENT BASED ON INTELLECTUAL PROPERTY RIGHTS

(75) Inventors: Rose Anne Hagan, Los Altos, CA (US); Kulpreet Singh Rana, Bainbridge Island, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/958,145

(22) Filed: Dec. 1, 2010

(65) Prior Publication Data
US 2011/0072518 A1    Mar. 24, 2011

Related U.S. Application Data

(63) Continuation of application No. 11/094,793, filed on Mar. 31, 2005, now Pat. No. 7,870,605.

(51) Int. Cl.
*G06F 17/00* (2006.01)
(52) U.S. Cl. ...... 726/26; 705/51; 705/14.47; 705/14.49; 705/14.73; 705/310
(58) Field of Classification Search ............ 726/26, 726/1; 705/51, 14.7, 14.49, 14.73, 310
See application file for complete search history.

(56) References Cited

U.S. PATENT DOCUMENTS

| | | | |
|---|---|---|---|
| 6,401,118 B1 * | 6/2002 | Thomas | 709/224 |
| 7,346,605 B1 | 3/2008 | Hepworth et al. | |
| 2002/0174132 A1 * | 11/2002 | Silverman | 707/104.1 |
| 2003/0208624 A1 | 11/2003 | Grossman | |
| 2004/0006542 A1 | 1/2004 | Gilliam et al. | |
| 2004/0030741 A1 | 2/2004 | Wolton et al. | |
| 2005/0028188 A1 | 2/2005 | Latona et al. | |
| 2005/0149390 A1 | 7/2005 | Scholl et al. | |
| 2007/0299777 A1 | 12/2007 | Shraim et al. | |

OTHER PUBLICATIONS

Co-pending U.S. Appl. No. 11/094,793, filed Mar. 31, 2005 entitled "Automated Screening of Content Based on Intellectual Property Rights" by Rose Anne Hagan et al., 31 pages.
International Search Report and Written Opinion mailed on Oct. 24, 2008 issued in corresponding International Application No. PCT/US06/12343, 8 pages.
"eBay's Verified Rights Owner (VeRO) Program," http://pages.ebay.com/help/confidence/vero-rights-owner.html, Print Date: Dec. 23, 2004. 2 pp.

* cited by examiner

*Primary Examiner* — Ellen Tran
(74) *Attorney, Agent, or Firm* — Harrity & Harrity, LLP

(57) ABSTRACT

Systems and methods automatically scan content, such as advertisements, for a list of terms and/or phrases that may not be allowed in the content. In one implementation, the terms and/or phrases include trademarks. In this implementation, incoming advertisements may be automatically scanned for the presence of trademarks.

20 Claims, 9 Drawing Sheets

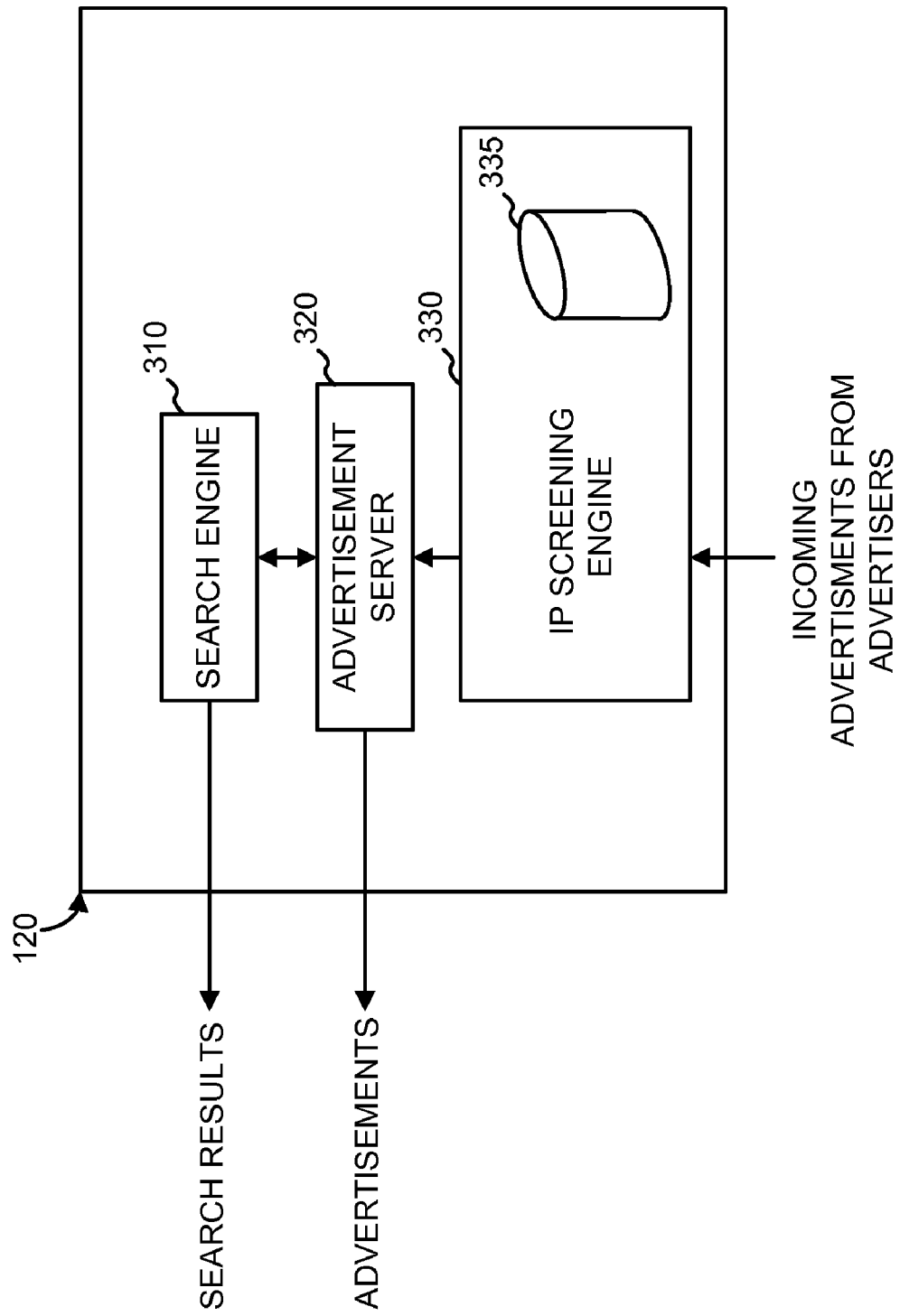

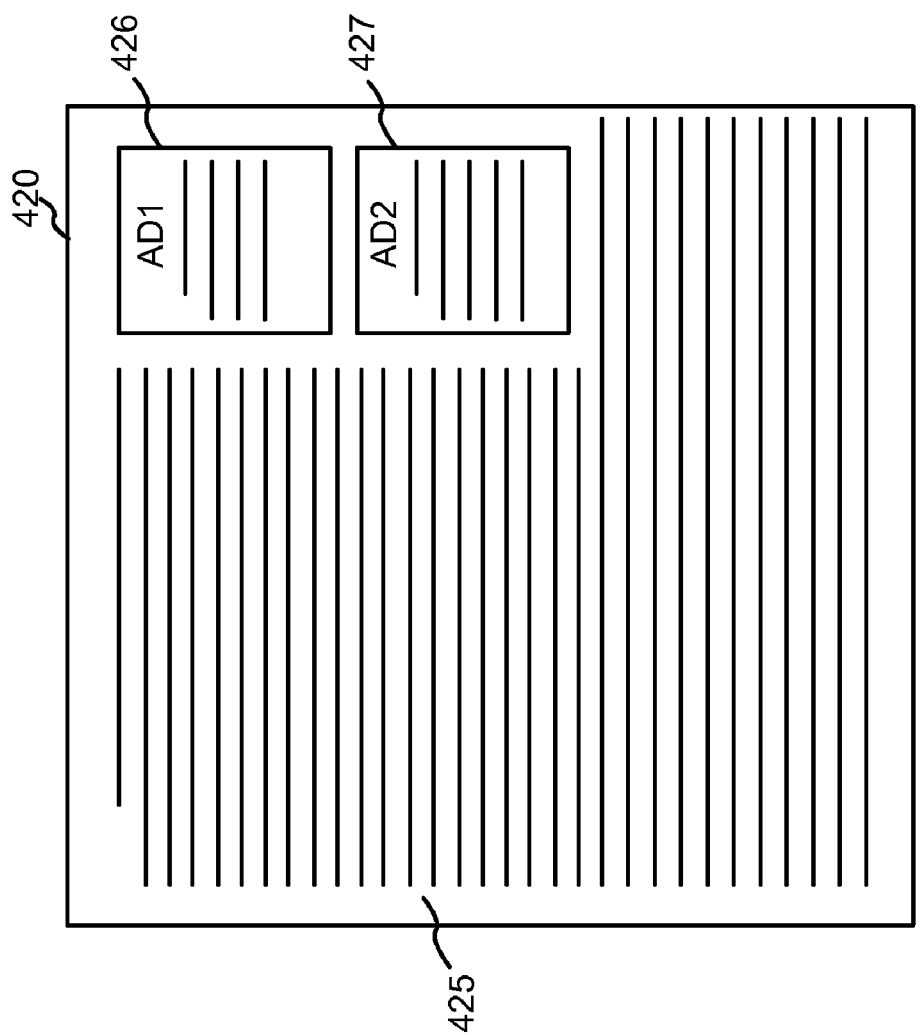

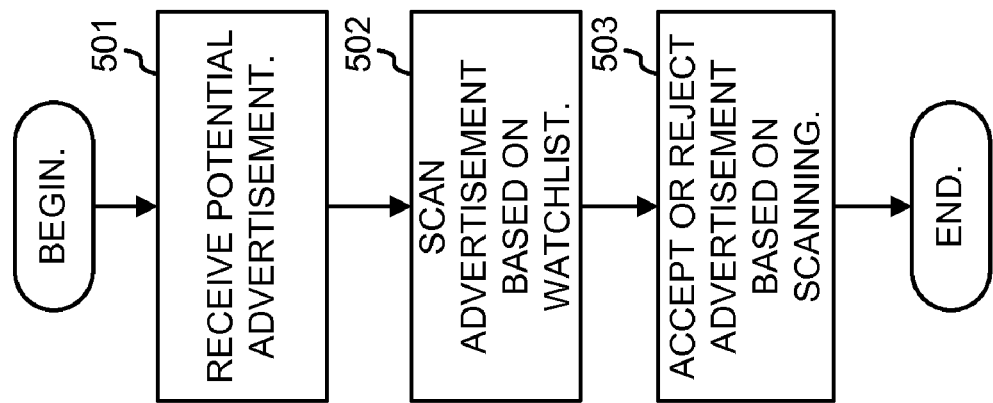

AUTOMATED SCREENING OF CONTENT BASED ON INTELLECTUAL PROPERTY RIGHTS

RELATED APPLICATION

This application is a continuation of U.S. patent application Ser. No. 11/094,793, filed Mar. 31, 2005, which is incorporated herein by reference.

BACKGROUND

In the ever changing online world, content can be ephemeral. One group to which this can pose problems is intellectual property rights owners. Certain intellectual property rights, such as trademark and copyright rights, may be alleged to be infringed by a particular web site, posting, or advertisement for a short or undefined period of time. For example, a trademark may be alleged to be infringed by an advertisement that only appears to some visitors of a particular site.

For a rights owner, policing these rights can be a difficult task. In addition to the non-trivial task of locating the potentially infringing content, the intellectual property rights owner can face the additional burden of convincing the web site owner to remove the content in a timely manner. From the standpoint of the publishers pages that infringe intellectual property rights can arguably expose the publisher to legal liability as well as hurt customer relations.

Accordingly, it would generally be desirable to have systems for addressing problematic content.

SUMMARY

One aspect is directed to a machine-implemented method that includes receiving content that is to be provided to users and scanning the content for trademarked terms. The method further includes determining whether to allow the content to be provided based on the scanning.

Another aspect is directed to a machine-implemented method that includes receiving an advertisement from an advertiser that is to be provided to end-users and scanning the advertisement for terms or phrases in a list. The method further includes determining whether to accept the advertisement based on the scanning.

Yet another aspect is directed to a system that includes logic to screen an advertisement received from an advertiser for violations by screening for trademarked terms or phrases occurring in text of the advertisement that the advertiser designates as the text that is to be displayed to end-users. The system further includes logic to transmit the advertisement to end-users based on the advertisement not including violations.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram illustrating an exemplary embodiment in which the server shown in FIGS. 1 and 2 implements a search engine, an advertisement server, and an IP screening engine;

FIG. 4B is a diagram illustrating another exemplary web page that may include advertisements;

FIG. 5 is a flow chart illustrating exemplary operations performed by the IP screening engine shown in FIG. 3;

DETAILED DESCRIPTION

The following detailed description of the invention refers to the accompanying drawings. The detailed description does not limit the invention.

Overview

Techniques are described herein that provide for automated screening of content. In one implementation, advertisements that are submitted to a content host are automatically screened for potential intellectual property rights violations before the advertisements are provided to the end-user. For example, the text of the advertisements may be compared to a watchlist of known trademarked terms/phrases to determine if the advertisement potentially infringes any of the known terms or phrases.

System Description

Figure 1:
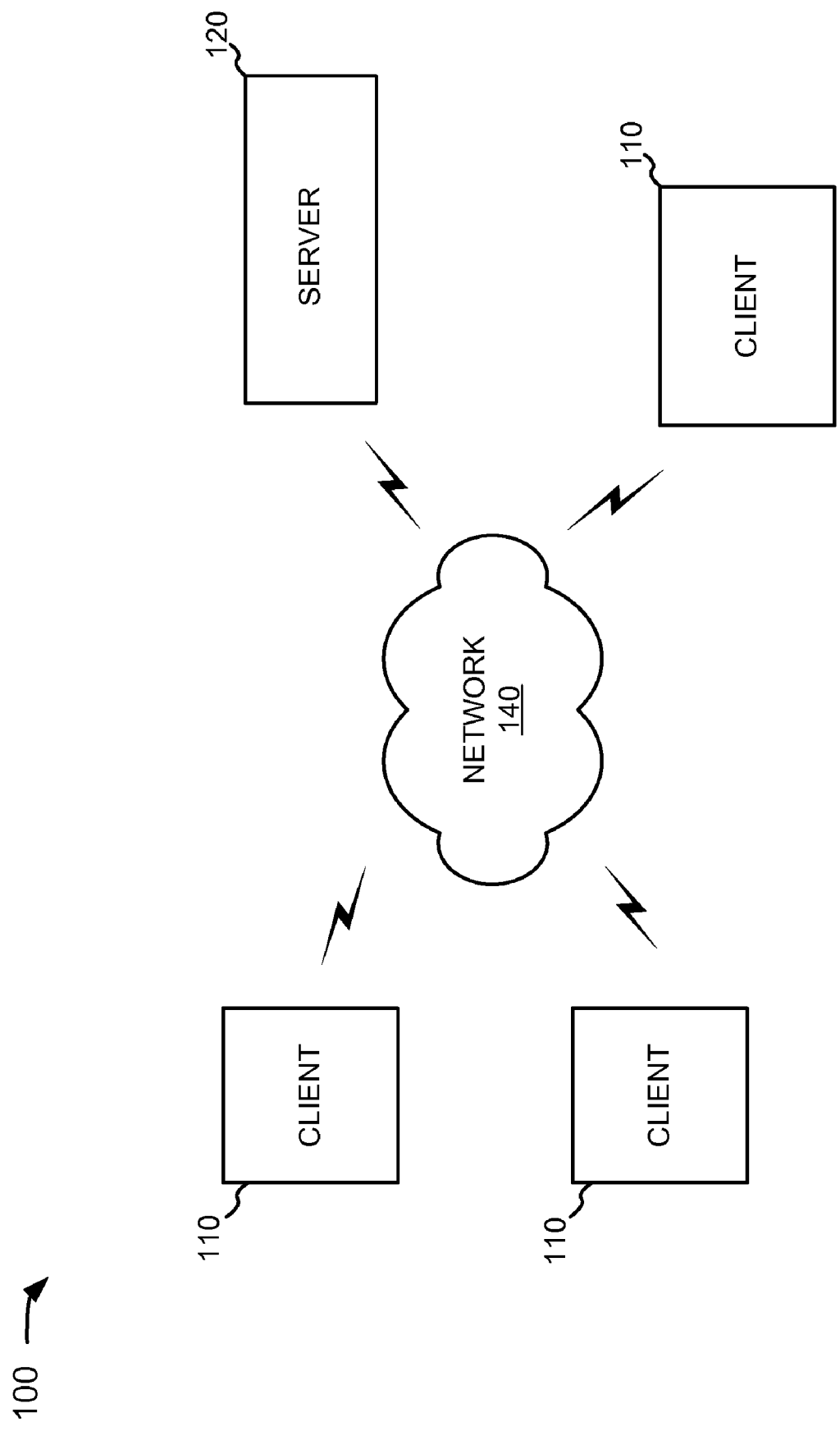
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple clients 110 connected to a server 120 via a network 140. Network 140 may include a local area network (LAN), a wide area network (WAN), a telephone network, such as the Public Switched Telephone Network (PSTN), an intranet, the Internet, or a combination of networks. Three clients 110 and one server 120 have been illustrated as connected to network 140 for simplicity. In practice, there may be more clients and/or servers. Also, in some instances, a client may perform one or more functions of a server and a server may perform one or more functions of a client.

A client 110 may include a device such as a wireless telephone, a personal computer, a personal digital assistant (PDA), a lap top, or another type of computation or communication device, a thread or process running on one of these devices, and/or an object executable by one of these devices. Server 120 may include a server device that processes, searches, and/or maintains documents and images in a manner consistent with the principles of the invention. Clients 110 and server 120 may connect to network 140 via wired, wireless, or optical connections.

Server 120, in one implementation, may include a search engine that receives search queries from clients 110 and returns links to results relevant to the search queries to clients 110. Server 120 may also return advertisements with the search query results. For example, third parties may contract with the operator of server 120 to display their advertisements when their advertisements are relevant to a search query.

Exemplary Client/Server Architecture

Figure 2:
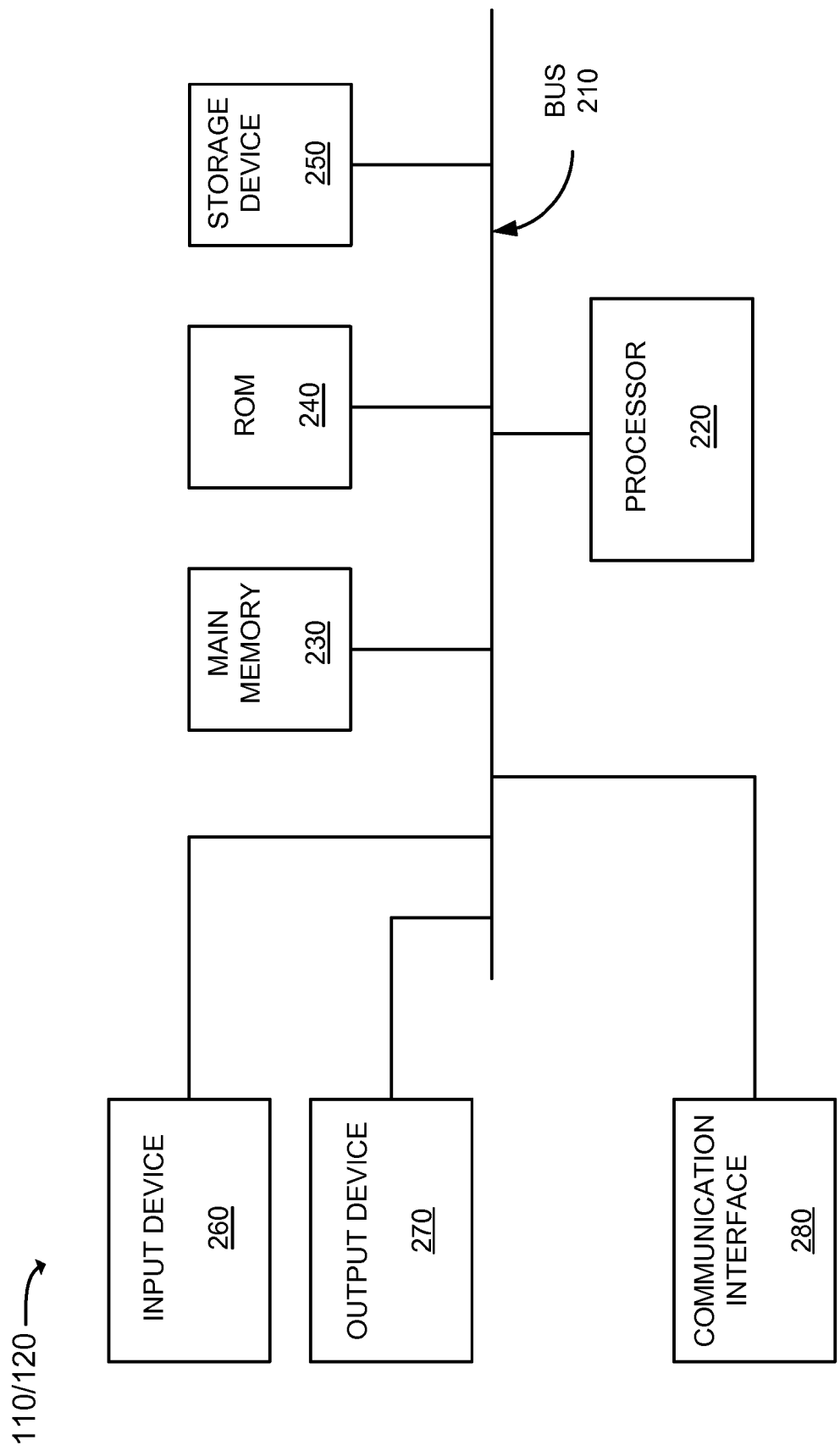
FIG. 2 is an exemplary diagram of a client or server shown in FIG. 1.

FIG. 2 is an exemplary diagram of a client 110 or server 120. Client/server 110/120 may include a bus 210, a processor 220, a main memory 230, a read only memory (ROM) 240, a storage device 250, an input device 260, an output device 270, and a communication interface 280. Bus 210 may include conductors that permit communication among the components of client/server 110/120.

Processor 220 may include conventional processors, microprocessors, or processing logic that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to client/server 110/120, such as a keyboard, a mouse, a pen, voice recognition and/or biometric mechanisms, etc. Output device 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

Functions implemented by client/server 110/120 may be stored as software instructions in a computer-readable medium, such as memory 230. A computer-readable medium may be defined as one or more physical or logical memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of a single server 120.

Server 120

FIG. 3 is a diagram illustrating an exemplary embodiment in which server 120 implements a search engine 310, an advertisement server 320, and an IP screening engine 330. Although server 120 is shown as a single device in FIG. 3, one of ordinary skill in the art will recognize that server 120 could be implemented as one or more distributed computing devices. Further, search engine 310, advertisement server 320, and IP screening engine 330 could be implemented on a single computing device or on separate devices. In some implementations, certain functions of one or more of search engine 310, advertisement server 320, and IP screening engine 330 could be combined.

Search engine 310 may generally be designed to return links to web pages in which a user may be interested. Search engine 310 may base its determination of the user's interest on a search query entered by the user. Search engine 310 may locate results relevant to the search query by matching the terms in the search query to a corpus of pre-stored documents, such as web pages. Documents that contain the user's search terms are "hits" and may be returned to the user as links.

Advertisement server 320 may generate advertisements that are displayed to the users. The advertisements may be transmitted with the search results from search engine 310 or, in some implementations, may be displayed in web pages hosted by third parties. Exemplary web pages, including advertisements served by advertisement server 320, are illustrated in FIGS. 4A and 4B.

Figure 4A:
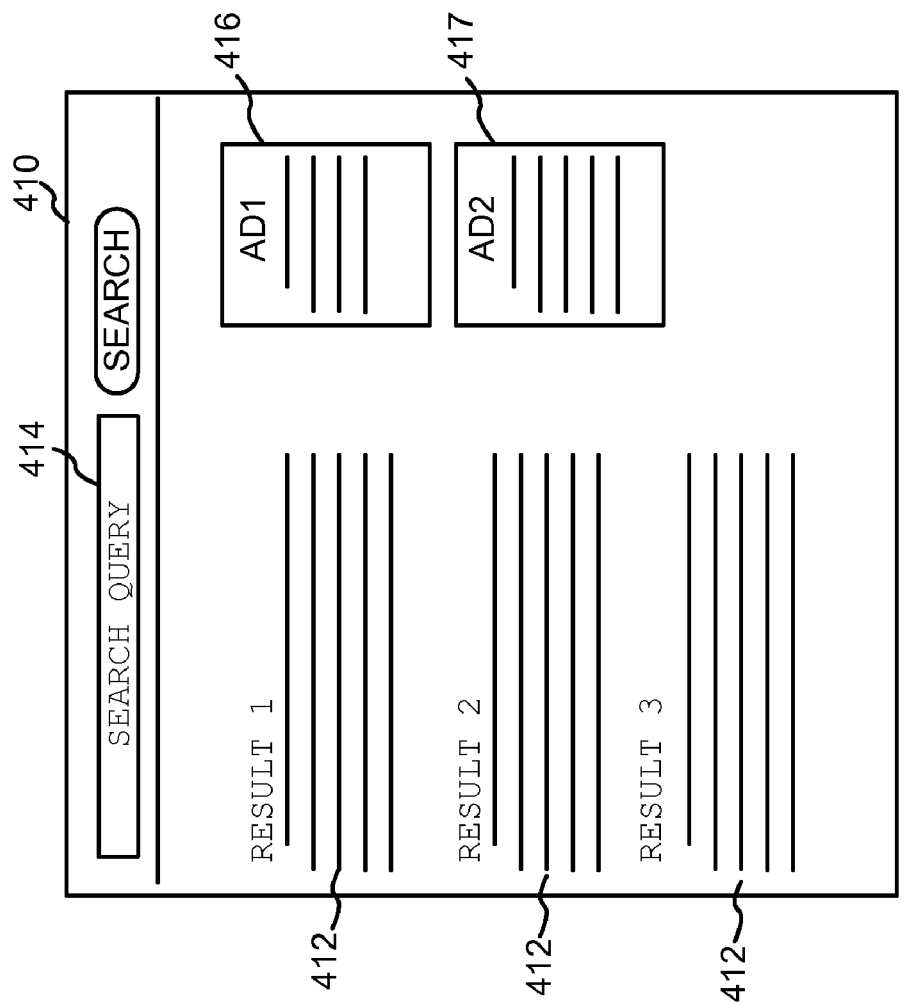
FIG. 4A is a diagram illustrating an exemplary web page that may include advertisements provided to clients.

FIG. 4A is a diagram illustrating an exemplary web page 410 that may be provided by search engine 310 and/or advertisement server 320 to clients 110. In this example, web page 410 is a web page that displays results 412 that relate to a search query 414 submitted by one of clients 110. Web page 410 may additionally display advertisements, such as advertisements 416 and 417, which may be text and/or graphical advertisements that were determined by server 120 to be relevant to results 412 and/or search query 414. Although shown in this figure as separate, the advertisements 416 and 417 need not be separated from results 412.

In some implementations, advertisements 416 and 417 may have been selected by advertisement server 320 for display from a set of advertisements that were submitted by third-parties (advertisers). The advertisers may, for instance, provide the text of their advertisements as well as a list of terms (called keywords or trigger terms herein) that the advertiser would like to use to trigger the display of their advertisement. When a user enters a search query that includes the trigger terms, advertisement server 320 may provide the advertisement to the user.

FIG. 4B is a diagram illustrating an exemplary web page 420 that may include advertisements provided by advertisement server 320. In this example, web page 420 contains content 425 and one or more advertisements 426 and 427. Web page 420 may generally be hosted by a party distinct from the party that provides advertisements 426 and 427. For example, web page 420 may be a web page from a web site targeted to auto enthusiasts. Advertisements 426 and 427 may be advertisements selected by and displayed on the web page by an entity distinct from the entity that hosts the web site, such as by advertisement server 320.

The foregoing represent only two methods for displaying advertisements. More generally, advertisements may be targeted to a user through a variety of mechanisms.

As discussed above, advertisements from advertisement server 320 may be submitted by third-party advertisers. Some advertisers may, either intentionally or inadvertently, submit advertisements that in some way allegedly violate intellectual property rights of another party or violate policies expressed by the content host controlling advertisement server 320. IP screening engine 330 may assist advertisement server 320 by screening advertisements for such violations. IP screening engine 330 may base its screening on a "watchlist" of terms/phrases stored in watchlist 335, or on a variety of other possible criteria (e.g., number of problematic advertisements submitted by a particular entity over a defined time period, an external database of some sort (e.g., compilation of trademarks), list of questionable advertisers or Internet Protocol addresses, etc). The operation of IP screening engine 330 will be described in more detail below.

IP Screening Engine

FIG. 5 is a flow chart illustrating exemplary operations performed by IP screening engine 330.

Advertisements may be received from advertisers or some other source acting in conjunction with advertisers (act 501).

In one implementation, the advertisers may submit advertisements through an on-line user interface that allows the advertisers to submit advertisement text that they would like to have displayed as well as trigger terms that define when the advertisement is displayed.

Figures 6A, 6B:
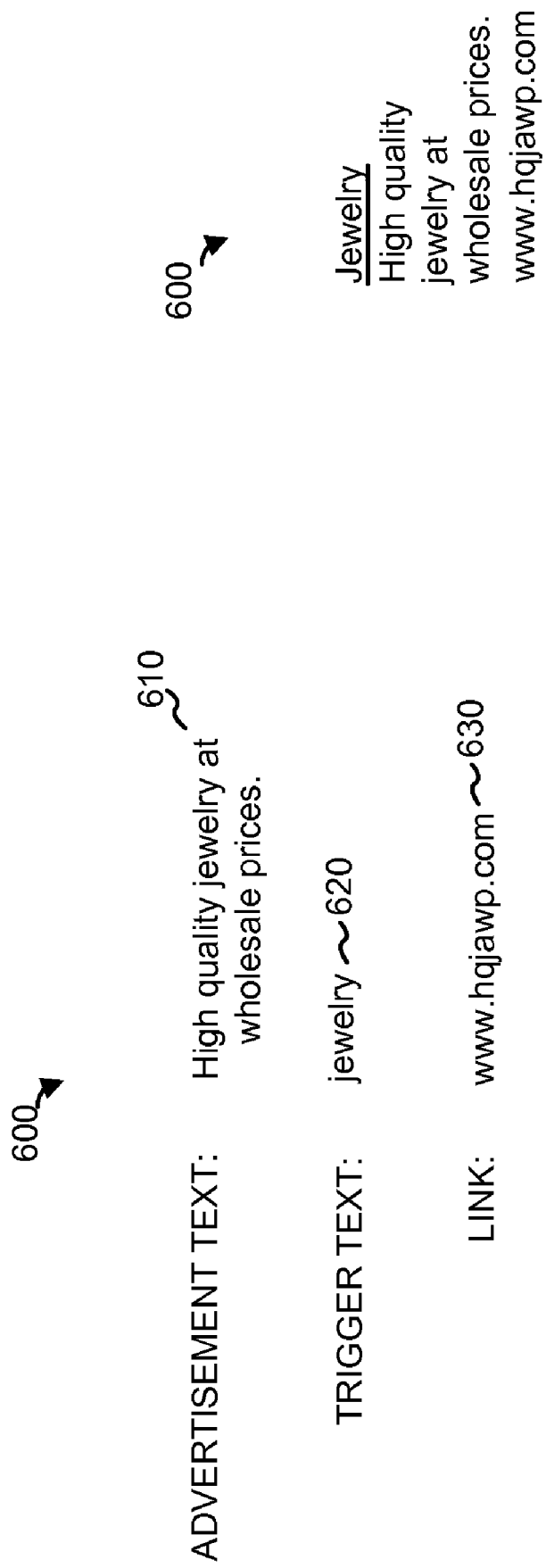
FIGS. 6A and 6B are diagrams illustrating an exemplary advertisement submitted by an advertiser.

FIG. 6A is a diagram illustrating an exemplary advertisement 600 submitted by an advertiser. The advertiser may include advertisement text 610 and trigger text 620. In this example, the advertiser would like advertisement text 610 displayed when a user of search engine 310 includes the terms "jewelry" in their search query. The advertiser may also enter a link 630 for the advertisement and anchor text 640 that the advertiser would like displayed with link 630.

FIG. 6B is a diagram illustrating a rendered version of advertisement 600 provided to client 110. Advertisement 600 may be displayed, for example, as advertisement 416 or 417 (FIG. 4), in response to a user search query 414 that includes the term "jewelry."

Submitted advertisements, such as advertisement 600, may be automatically scanned by IP screening engine 330 before the advertisements are provided to the end-user (act 502). The screening may detect potential intellectual property rights violations and/or violations of policies set by the content host. In one implementation, the screening may include comparing advertisement text 610 to a list of suspect terms stored in watchlist 335. The suspect terms may include, for example, trademarked terms or phrases. In other implementations, the screening may additionally include comparing trigger text 620 or other portions of the proposed advertisement to watchlist 335.

Figure 7:
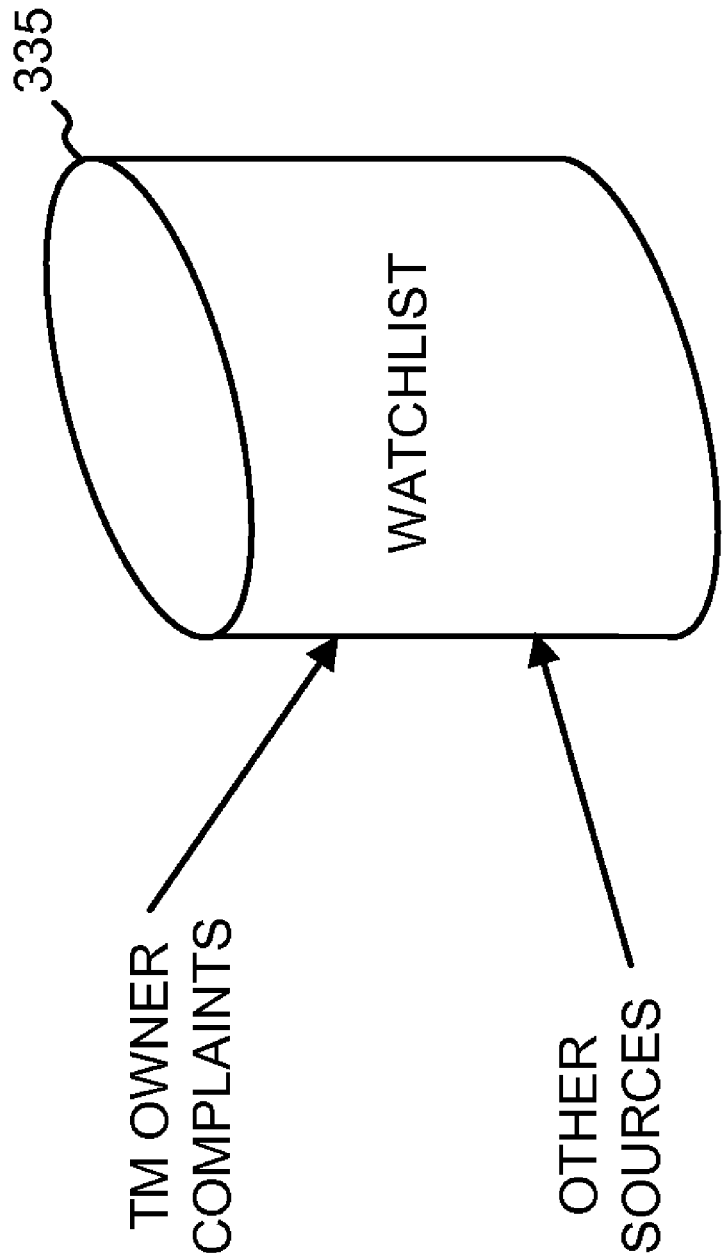
FIG. 7 is a diagram illustrating the watchlist shown in FIG. 3.

FIG. 7 is a diagram illustrating watchlist 335 in additional detail. As described above, watchlist 335 may include a list of terms/phrases that are known to define trademarked (including service marks) terms/phrases. These terms/phrases may be compiled from complaints submitted by trademark owners to the content host (i.e., the entity operating search engine 310 and/or advertisement server 320). In alternate implementations, other sources may be used to add to watchlist 335, such as information from the United States Patent and Trademark Office or other sources of known trademarks.

Referring back to FIG. 5, based on the comparison to watchlist 335, the advertisement may be accepted, rejected, or subject to further review by the content host (act 503). For example, advertisements that include terms in watchlist 335 may be rejected or subject to further review by the content host. In this manner, proposed advertisements may be automatically and efficiently evaluated by the content host.

Figure 8:
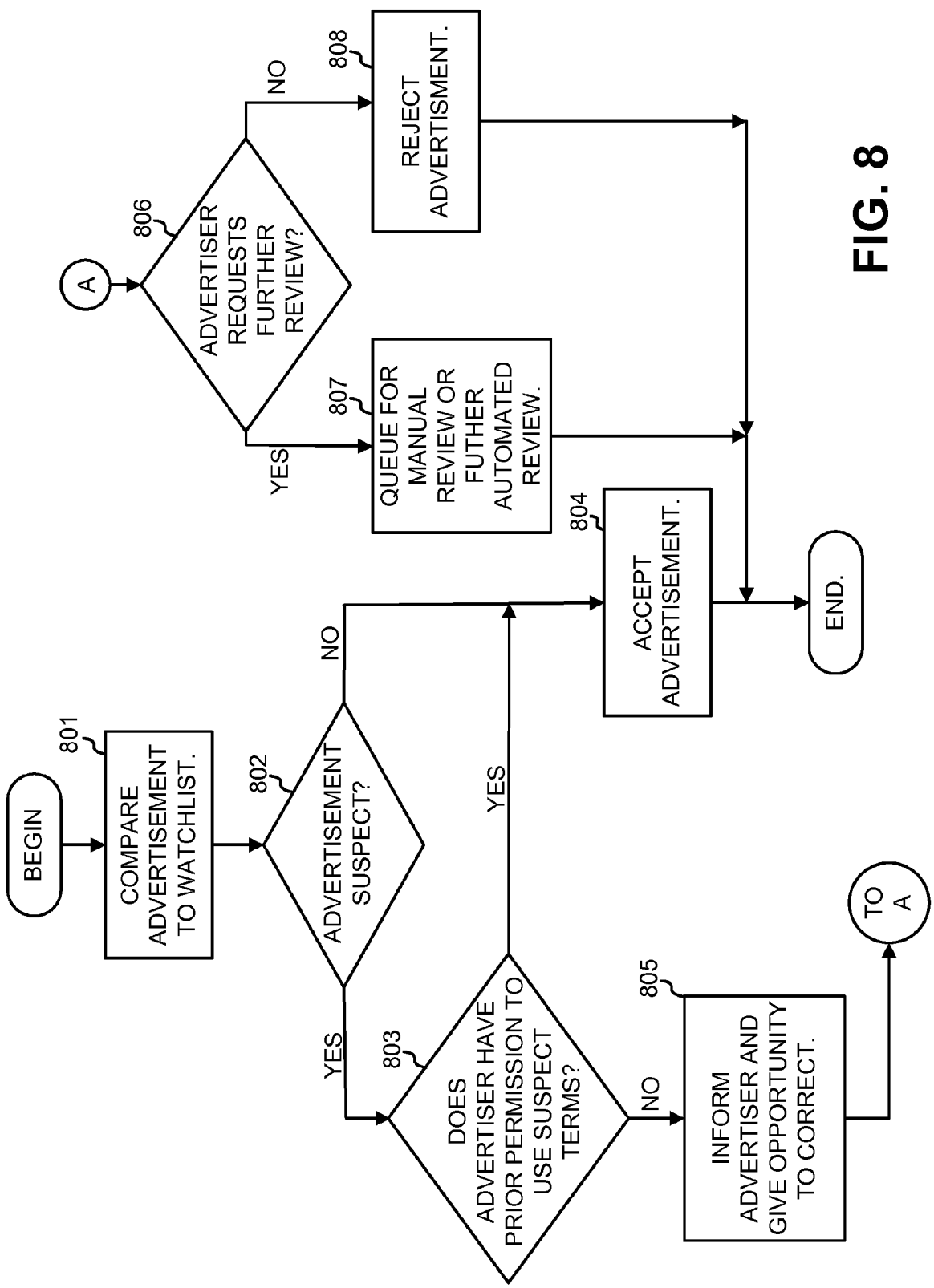
FIG. 8 is a flow chart illustrating additional exemplary operations for screening advertisements.

FIG. 8 is a flow chart illustrating additional possible operations for screening and accepting/rejecting advertisements by IP screening engine 330 (acts 502 and 503). IP screening engine 330 may begin by comparing the terms in the advertisement to watchlist 335 (act 801). In one implementation, the "terms" in the advertisement can include all the terms that are actually displayed with the advertisement, such as advertisement text 610, link 630, and anchor text 640. In an alternate implementation, triggetext 620 may also be included in the comparison. If one or more of the terms in the advertisement are in watchlist 335, the advertisement may be considered to be suspect and may be subject to further evaluation (act 802). Otherwise, the advertisement may be accepted and the advertiser may be immediately informed that the advertisement has been accepted (act 804).

If the advertisement is considered suspect, however, the advertisement may be further examined. In some situations, the advertiser may have permission to use the terms from watchlist 335 (act 803). For example, the advertiser may be the owner, or an agent of the owner, of the trademarked term that matches the term(s) from watchlist 335. In this situation, the advertisement may be accepted (act 804), subject to the advertiser providing some level of assurance that they are the owner of the trademark or agent of the owner. Such assurance may be as simple as a representation made by the advertiser; alternatively, it may be more rigorous such as requiring some level of proof that the advertiser has the asserted rights.

If the advertiser does not have permission to use the term (s), the advertiser may be informed that the advertisement is suspect and may be given an opportunity to change the advertisement (act 805). If the advertiser does not wish to change the advertisement, but believes that the advertisement should nevertheless be accepted, the advertiser may be given the option of requesting further review of the advertisement (act 806). The advertisement may then be queued for further review, such as by a human operator or further automated review (act 807). For example, the advertiser may be given an opportunity to make a representation of some sort that they believe the usage is permitted by law or otherwise legal or authorized. This representation may be accepted on face value or may be subject to further verification.

It may be desirable, though not required, to correlate the level of verification to the degree to which the advertisement will be allowed to run. For example, if the representation is accepted on face value, the publisher may choose to make it easier for the rights owner to countermand that representation. The publisher may notify the rights owner that the advertiser has represented that the advertisement is permissible (this may be accompanied by contact information for the rights owner to contact the advertiser) and that the advertisement will be provisionally allowed to run. This may be accompanied by allowing the rights owner to make a counter-representation of some sort, which would result in the advertisement being either rejected or subject to further investigation.

If the advertiser does not want further review and does not want to change the advertisement, the advertisement may be rejected (act 808).

In addition to the advertiser being the owner of the trademark or an agent for the owner, a number of possible situations may exist in which an advertiser may be entitled to use a term even through the term is present in watchlist 335. In the context of a trademark, the use may be nominative or outside the scope of the trademark. For example, although the term "apple" is a trademark of Apple Computer, Inc., a non-computer related advertisement may still use the term apple because it is outside the scope of the trademark (e.g., a fruit vendor selling apples). In any of these situations (or in any cases where advertisements are suspect for some reason), an approach like the one described above may be used. In any such situation, the proposed advertisement may be accepted, rejected, or submitted for further action (act 807) and the further action process may result in the advertisement being accepted.

In some implementations, the initial comparison of the advertisement text to the watchlist (act 801) may take into account possible exceptions to the intellectual property rights or policies. For instance, advertisements may be classified based on the products/services being advertised. If the product/service being advertised is outside the scope of the watchlist terms, such as the example of a fruit vendor selling apples and the trademark "Apple" owned by Apple Computer, Inc., the advertisement may immediately be determined to be not suspect and may be accepted.

In still other implementations, the comparison made in act 801 may take into account different comparison standards based on geographic area. For example, advertisements targeted for viewers in the United States may be evaluated using rules different than advertisements for other countries.

Conclusion

Systems and methods consistent with the principles of the invention may assist in automatically identifying content that potentially violates intellectual property rights or other policies relating to the content.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5 and 8, the order of the acts may be modified in other implementations consistent with the principles of the invention. Further, non-dependent acts may be performed in parallel.

Certain portions of the invention have been described as an "engine" that performs one or more functions. An engine may include hardware, such as an application specific integrated circuit or a field programmable gate array, software, or a combination of hardware and software.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   identifying, by one or more processors of one or more server devices, an advertisement;
   determining, by one or more processors of the one or more server devices, that one or more terms, associated with the advertisement, include a potential violation of intellectual property rights; and
   providing, by one or more processors of the one or more server devices and to an advertiser associated with the advertisement, an option for the advertiser to request further review of the advertisement when the one or more terms, associated with the advertisement, include the potential violation of intellectual property rights.

2. The method of claim 1, where the intellectual property rights include trademark rights.

3. The method of claim 1, where determining that the one or more terms, associated with the advertisement, include the potential violation of intellectual property rights comprises:
   compiling a list based on complaints submitted by intellectual property rights owners, and
   determining that the one or more terms include the potential violation of intellectual property rights by comparing the one or more terms to the list.

4. The method of claim 1, where the determining is based on a number of advertisements, that include potential intellectual property violations, submitted by a particular entity over a period of time.

5. The method of claim 1, where determining that the one or more terms, associated with the advertisement, include the potential violation of intellectual property rights comprises:
   determining that the one or more terms include the potential violation of intellectual property rights when the advertiser is identified in a list of suspect advertisers.

6. The method of claim 1, where the determining is based on an Internet Protocol address associated with the advertiser.

7. The method of claim 1, where determining that the one or more terms, associated with the advertisement, include the potential violation of intellectual property rights comprises:
   determining that the one or more terms, associated with the advertisement, are in a watchlist that includes a plurality of terms associated with intellectual property rights.

8. The method of claim 1, further comprising:
   providing, before providing the option for the advertiser to request further review and to the advertiser, an opportunity to change the advertisement;
   receiving, after providing the option for the advertiser to request further review of the advertisement and from the advertiser, an indication that use of the one or more terms is authorized; and
   allowing the advertisement to be displayed after receiving the indication.

9. The method of claim 8, where the one or more terms are one or more terms of a trademark, and where the advertiser is an owner of the trademark.

10. The method of claim 8, further comprising:
    notifying an owner of the intellectual property rights that the indication has been received;
    receiving a counter-indication from the owner; and
    storing, after receiving the counter-indication, the advertisement for further review.

11. The method of claim 1, where identifying the advertisement includes:
    identifying the advertisement based on a received search query.

12. The method of claim 11, where identifying the advertisement based on the received search query includes at least one of:
    identifying that text, that is displayed in association with the advertisement, includes one or more terms of the search query;
    identifying that a link, associated with the advertisement, includes the one or more terms of the search query;
    identifying that anchor text, associated with the link, includes the one or more terms of the search query; or
    identifying that one or more trigger terms, that define when the advertisement is displayed, includes the one or more terms of the search query.

13. The method of claim 1, further comprising:
    providing, before providing the option for the advertiser to request further review and to the advertiser, an opportunity to change the advertisement;
    receiving, after providing the option for the advertiser to request further review of the advertisement and from the advertiser, a request to further review the advertisement; and storing, after receiving the request, the advertisement for the further review.

14. A system comprising:
one or more processors to:
   identify an advertisement;
   determine that one or more terms, associated with the advertisement, include a potential violation of intellectual property rights; and
   provide, to an advertiser associated with the advertisement, an option for the advertiser to request further review of the advertisement when the one or more terms, associated with the advertisement, include the potential violation of intellectual property rights.

15. The system of claim 14, where the one or more terms, associated with the advertisement, include at least one of:
   one or more terms in text that is displayed in association with the advertisement,
   one or more terms in a link associated with the advertisement,
   one or more terms in anchor text associated with the link, or
   one or more trigger terms that define when the advertisement is displayed.

16. The system of claim 14, where the one or more processors are further to:
   provide, before providing the option for the advertiser to request further review and to the advertiser, an opportunity to change the advertisement;
   receive, after providing the option for the advertiser to request further review of the advertisement and from the advertiser, an indication that the advertiser is authorized to use the one or more terms;
   correlate a level of verification of the indication to a degree to which the advertisement is allowed to be displayed; and
   allow the advertisement to be displayed based on the degree to which the advertisement is allowed to be displayed.

17. A method performed by one or more server devices, the method comprising:
   receiving, by one or more processors of the one or more server devices, an advertisement;
   determining, by the one or more processors of the one or more server devices, whether text, which is to be displayed as part of the advertisement, violates policies set by the advertisement provider,
      at least some of the policies including policies relating to trademark violations; and
   providing, by the one or more processors of the one or more server devices and to an advertiser associated with the advertisement, an option for the advertiser to request further review of the advertisement when the text violates the policies set by the advertisement provider.

18. The method of claim 17, further comprising:
   receiving an indication that the advertiser is authorized to use the one or more terms, and
   allowing, based on the indication, the advertisement to be displayed.

19. The method of claim 17, where determining whether the text violates the policies comprises:
   comparing the text to a watchlist that includes one or more terms that are associated with trademark rights, and
   determining that the text violates the policies when one or more terms in the text match the one or more terms in the watchlist.

20. The method of claim 17, where determining whether the text violates the policies comprises:
   determining a classification of the advertisement based on a product or a service being advertised; and
   determining that the text violates the policies when the classification is within a scope of one or more trademark terms included in the text.

* * * * *